US008641500B2

(12) United States Patent
Martinez-Ortega

(10) Patent No.: US 8,641,500 B2
(45) Date of Patent: Feb. 4, 2014

(54) SYSTEM AND METHOD FOR AN INTERACTIVE LOTTERY GAME OVER A NETWORK

(75) Inventor: José M. Martinez-Ortega, Laval (CA)

(73) Assignee: José M Martínez, Laval, Quebec (CA)

( * ) Notice: Subject to any disclaimer, the term of this patent is extended or adjusted under 35 U.S.C. 154(b) by 237 days.

(21) Appl. No.: 13/306,330

(22) Filed: Nov. 29, 2011

(65) Prior Publication Data

US 2012/0165088 A1 Jun. 28, 2012

(51) Int. Cl.
*A63F 9/24* (2006.01)
*G06F 17/00* (2006.01)

(52) U.S. Cl.
USPC .................. 463/17; 463/42; 463/43; 463/18; 709/229; 273/138.2

(58) Field of Classification Search
None
See application file for complete search history.

(56) References Cited

U.S. PATENT DOCUMENTS 5,082,275 A 1/1992 Nilssen
5,186,463 A 2/1993 Marin et al.
6,142,872 A 11/2000 Walker et al.
6,203,011 B1 * 3/2001 Nulph ........................ 273/138.2
6,322,446 B1 11/2001 Yacenda
6,383,078 B1 5/2002 Yacenda
6,416,408 B2 7/2002 Tracy et al.
6,659,861 B1 12/2003 Faris et al.
6,869,358 B2 3/2005 Yacenda
6,935,952 B2 8/2005 Walker et al.
6,969,067 B1 11/2005 Borruso
7,052,394 B2 5/2006 Walker et al.
7,780,514 B2 8/2010 Walker et al.
2002/0094869 A1 * 7/2002 Harkham ........................ 463/42
2003/0228910 A1 * 12/2003 Jawaharlal et al. ............. 463/42
2004/0153557 A1 * 8/2004 Shochet et al. ............... 709/229
2004/0198498 A1 * 10/2004 Yamashita et al. .............. 463/43
2004/0242309 A1 * 12/2004 Melesko et al. ................ 463/18
2004/0266533 A1 * 12/2004 Gentles et al. .................. 463/42
2005/0032569 A1 * 2/2005 Turk .............................. 463/17

(Continued)

FOREIGN PATENT DOCUMENTS

WO WO 03022381 3/2003
WO WO 2006081022 8/2006

*Primary Examiner* — Paul A D'Agostino

(57) ABSTRACT

A system and method for increasing player odds at the expense of sharing the jackpot. The interactive lottery game consists in forming as many closed groups as possible, i.e., paid lottery entries, by having players wager small amounts in opened groups, i.e., unpaid lottery entries, before the day of the jackpot draw. Three levels of play are controlled by the system: i) random group play, chosen by players to place wagers; ii) customized group play, chosen by players to close specific groups; and iii) interactive group play for players transferring wagers from players' opened groups to other groups according to game strategies. This is a wiser lottery game because represent higher return on investment for players while increasing house profitability. It defines a new interactive lottery game accessible from any portable device or personal computer as long as players are connected to a network.

19 Claims, 14 Drawing Sheets

(56) References Cited

U.S. PATENT DOCUMENTS

| | | | | |
|---|---|---|---|---|
| 2005/0064931 | A1* | 3/2005 | Lathrop et al. | 463/17 |
| 2005/0107153 | A1* | 5/2005 | Jubinville et al. | 463/18 |
| 2007/0281770 | A1* | 12/2007 | Marcus | 463/9 |
| 2008/0132314 | A1* | 6/2008 | Robb et al. | 463/17 |
| 2009/0118022 | A1* | 5/2009 | Lyons et al. | 463/42 |
| 2009/0149258 | A1* | 6/2009 | Aviyants | 463/41 |
| 2009/0170607 | A1* | 7/2009 | Chiao et al. | 463/42 |
| 2009/0221342 | A1* | 9/2009 | Katz et al. | 463/17 |
| 2010/0173691 | A1* | 7/2010 | Wolfe | 463/17 |
| 2011/0065491 | A1* | 3/2011 | Wolfe | 463/17 |
| 2011/0201401 | A1* | 8/2011 | Kumbhat et al. | 463/17 |

* cited by examiner

SYSTEM AND METHOD FOR AN INTERACTIVE LOTTERY GAME OVER A NETWORK

CROSS REFERENCE TO RELATED APPLICATIONS

This application claims priority from Canadian patent application no. 2,726,738 filed Dec. 23, 2010.

FIELD

The present disclosure relates generally to the field of online gaming and, more specifically, to lotteries and similar gambling and betting games.

BACKGROUND

The new era in modern lottery started in 1912 when "Totalizator" was legalized, making racetracks the only legal betting place in Canada. The Queensland State Lottery of Australia was the first lottery to start operations in the 20th century and from there on governments around the world start to consolidate lottery businesses, hereafter named as houses, as main stream of revenues. For example, portions of these revenues in United States were used to construct famous universities like Harvard, Yale and Brown in the United States and overall to support either federal or provincial community programs.

Lottery games are among the most successful games of chance. The reason stems from the intrinsic nature of the game. Lottery players know that they become millionaires upon hitting the jackpot. That is the biggest incentive for players to come back and play again and again even though the game has more drawbacks than benefits. Typically, lottery players are frustrated because of the low return of investment the game represents. Players' odds are extremely low (in the order of $10^{-7}$). For instance, a lottery 6/49 game, six numbers are drawn from a pool of 49 numbers. The total possible number of combinations, when the order of numbers is irrelevant, is given by the well-known combination rule: $49!/(6!\times(49-6)!)=13,983,816$. Therefore, if a player after purchasing of single entry received another two generated random numbers, the probability to hit the jackpot is=possible chances/all possible combinations, i.e. $3/13,983,816=2.1\times10^{-7}$. This is probabilistic calculation of return on investment for players was described in prior art, U.S. Pat. No. 5,082,275. Despite of the fact that the former patent disclosed a high return on investment for players, in practice such low probability discouraged players and, overall, more frustration in players was created. Recognizing this limitation, U.S. Pat. No. 5,186,463 introduced several sublevels of cash rewards depending on the total matches corresponding to the winning number. For instance, a primary cash award was granted for a player who guessed all numbers, a secondary award was awarded for a player who guessed five out of six numbers, and so on and so forth. In addition, houses stipulate lotto rules encouraging players to buy more than a single lottery number and also to play multiple selections. The interest of players has grown and thus the ticket sales from houses. Players were motivated to play lottery games because of their odds were higher. However, the only opportunity for them to increase their odds was to buy more lottery entries. For instance, if the player decides to buy 10 entries ($2 dollars each) she/he needs to invest $20 dollars. However, players' odds remain practically unchanged. That is: $(30(10\times3)/13,983,816)=2.1\times10\hat{}-6$. That brought another unwanted effect; that of decreasing game popularity and to the detriment of the houses' sources of income. Lotto players were more likely to lose control of their expenses and go bankrupt, lose their jobs, friend and even families. On the other hand in people's mind was created an image that lottery was a "sick" source of revenue of governments. Numerous efforts have been undertaken in the past decades to change that image around. Today, most of houses have strict rules regarding gambling and encourage all players to play responsibly.

As part of these efforts a previous applications has introduced the concept of team play as a way to increase players' returns. The application described in U.S. Pat. No. 6,142,872, used the concept of team play for a game of chance conducted in slot machines. Players' odds increased while playing as a team and they were able to combine their success during the game segment to achieve better payouts at the end of the section. Another important step in the concept of team play was introduced by U.S. Pat. No. 6,416,408. Players start wagering as a group in a plurality of game levels. The team shared both successes and losses as the game progressed. The different levels of the game were interconnected such that rewards depended on whether the team succeeded in the previous level. Players felt more comfortable losing as a team rather than losing alone.

Technological advances in the mid 90's led to the introduction of HyperText Transport Protocol (HTTP), HyperText Markup Language (HTML), and Domain Name System (DNS), a globally-extensive hyper-linked database referred to as the World Wide Web (WWW) that has quickly evolved as the infrastructure of the Internet. The challenges facing game of chances when played online were addressed in U.S. Pat. No. 6,659,861. The inclusion of internet opened a more convenient way for players to play lottery right from the comfort of their home (see U.S. Pat. Nos. 6,322,446; 6,383,078; and 6,869,067) while keeping the game regulated by governmental agencies. Other off-line scenarios for players wagering was disclosed by Walker et al., U.S. Pat. No. 6,935,952. Another supplementary lottery game introduced by Walker et al. in U.S. Pat. No. 7,052,394 exploited the idea of the creation of groups of lottery tickets around one player. A player creates a group of lottery tickets registering those in what inventors called Theta-game'. Players might qualify for secondary awards, if the primary winning entries fail to win the jackpot and if any of its primary entries are under certain threshold with respect to the winning entry. However, in such cases the only option players have to increase their odds is buying more lottery entries at the same fixed price. In addition, a registration fee was applied to players to play the meta-game. Yet, in U.S. Pat. No. 7,780,514 by Walker, the mode of creating groups around a single lotto entry has not been exploited.

In all of the above publications, players are engaged in a 'passive' lotto game. That means players at authorized retailers (e.g., in person, over the telephone, or via the Internet) play the lottery in at least two different ways: 1) players pick a selection by mechanically scratching n-numbers in a poll of m-numbers for the price of k-value (e.g., from $1 up to $2) per entry; 2) players might select a 'quick-pick' and a random number is generated from an automated console and accredited to players. In any case, the players receive a confirmation ticket with the imprint of the selected play which includes two additional random entries per entry bought. Then, the players wait until the official winning number is advertised by the media or in internet in order to know whether or not the ticket purchased is the winning number.

It would be desirable to provide a novel lottery game, hereafter named "interactive lottery game", which would increase players' return on investment and help players to overcome negative outcomes of lottery gambling. It would be also be desirable to provide an interactive lottery game which permits players to increase their odds while increasing house profitability.

The present disclosure recognizes the strong desirability of increasing player's odds in today's gambling industry, and addresses the need to attract and hold participants' interest through heightened the interactive and interactive lotto game. Accordingly, the present disclosure addresses the current need in the gaming industry for a manner of augmenting player's odds in lotteries by creating groups of player's wagering at least once cent of the cost of a single lotto entry. Thus, the present disclosure fulfills the aforementioned and other shortcomings of the prior art, and offer a variety of advantages over prior art gaming approaches.

SUMMARY

According to an embodiment, there is provided a method for playing an interactive online lottery game played by players on respective player devices capable of communication with a gaming server unit, the method comprising: creating, by the gaming server unit, groups to which are respectively associated a group total wager amount and a combination of symbols; receiving, at the gaming server unit, from each of the players, a player wager amount; associating fractions of each player wager amount to at least a portion of the groups thereby assigning a distribution percentage of each group of the at least a portion of the groups to each player, wherein the fractions are less than one; closing, by the gaming server unit, groups for which the sum of the fractions of the player wager amounts associated thereto equals the group total wager amount, thereby resulting in closed groups; comparing a draw result obtained from a limited pool of draw results to the combination of symbols for each closed groups; based on the comparing, determining a winning group; and calculating a distribution of the prize among the players associated to the winning group according to the assigned distribution percentage; whereby the associating fractions of each player wager amount among at least a portion of the groups increases the probability for a player to win the prize as compared to the probability for a player to win the prize in the absence of the step of associating fractions.

According to an aspect, the associating comprises randomly distributing, by the gaming server unit, the player wager amounts among the groups.

According to an aspect, the associating comprises a step where each player selects the groups to which the player wager amounts are distributed by using the combination of symbols associated to the groups.

According to an aspect, the method further comprises showing a status of each of the selected groups, wherein the status can be one of: open, available, closed and homologue.

According to an aspect, the associating comprises forwarding a query from a player to the gaming server unit, the query comprising a criterion, and performing a search on the groups using the query.

According to an aspect, the performing a search results in showing a status of each of the groups, the status comprising one of: open, available, closed.

According to an aspect, the method further comprises, for open groups, giving a player an opportunity to change the associating of its player wager amount.

According to an aspect, the method further comprises giving a player an opportunity to create a homologue group, the homologue group having the same combination of symbol associated thereto as a closed group.

According to an aspect, the criterion of the query sorts open groups in ascending or descending order and further displays an amount remaining to close each of the open groups.

According to an aspect, the assigning a distribution percentage comprises dividing the fraction of a player wager amount distributed to a group over that group's total wager amount multiplied by 100.

According to an aspect, the method further comprises performing a draw by the gaming server unit to obtain the draw result.

According to an aspect, wherein for groups which are not closed when the draw is performed, the gaming server unit keeps the associated fractions of each player wager amount.

According to an aspect, the performing a draw takes place at a fixed deadline.

According to an aspect, the method further comprises automatically sending, by the gaming unit through a player device, a notification to a player for which a player wager amount is associated that a group is closed.

According to an aspect, wherein a minimal amount for player wager amount is one cent.

According to an embodiment, there is provided a gaming server unit for playing an interactive online lottery game played by players on respective player devices capable of communication with a gaming server unit, the gaming server unit comprising: an input to receive, from each of the players, a player wager amount; a processor; a memory device accessible by the processor, the memory device storing instructions for retrieval by the processor to implement the processor to: create groups to which are respectively associated a group total wager amount and a combination of symbols; based on an association of fractions to each player wager amount to at least a portion of the groups, assign a distribution percentage of each group of the at least a portion of the groups to each player, wherein the fractions are less than one; close groups for which the sum of the fractions of the player wager amounts associated thereto equals the group total wager amount, thereby resulting in closed groups; compare a draw result obtained from a limited pool of draw results to the combination of symbols for each closed groups; based on the compare step, determine a winning group; and calculate a distribution of the prize among the players associated to the winning group according to the assigned distribution percentage; whereby the associated fractions of each player wager amount among at least a portion of the groups increases the probability for a player to win the prize as compared to the probability for a player to win the prize in the absence of the associating fractions step.

According to an aspect, the gaming server unit is connected to the respective player devices over a network.

According to an aspect, the network comprises at least one of the Internet, a Local Area Network ("LAN"), a Wide Area Network ("WAN") and a wireless connection.

According to an embodiment, there is provided a method for playing interactive online game and being played by players on respective devices each being in communication with a gaming server unit, the method comprising: creating, by the gaming server unit, groups to which are respectively associated a group total wager amount and a potential outcome; receiving, at the gaming server unit, from each of the players, a player wager amount; associating fractions of each player wager amount to at least a portion of the groups thereby assigning a distribution percentage of each group of the at least a portion of the groups to each player; closing, by the gaming server unit, groups for which the sum of the fractions of the player wager amounts distributed thereto equals the group total wager amount, thereby resulting in closed groups; obtaining a winning outcome and comparing the winning outcome to the potential outcome for each closed groups; and based on the comparing, determining a winning group; and calculating a distribution of the prize among the players associated to the winning group according to the assigned distribution percentage; whereby the associating fractions of each player wager amount among at least a portion of the groups increases the probability for a player to win the prize as compared to the probability for a player to win the prize in the absence of the associating fractions step.

According to an embodiment, there is provided a method and a system of increasing lottery players' odds to obtain the primary award at spend of sharing the primary award with other players.

According to another embodiment, the method creates groups of lottery players wagering a percentage of the cost of a single lottery entry.

According to another embodiment, there is provided a method of players' payouts based on the percentage wagered by players in winning groups.

According to another embodiment, there is provided a system for placing a unique identification of the interactive lottery players and their opened and closed groups.

According to another embodiment, there is provided a system for allowing player to customize wagers remotely.

According to another embodiment, there is provided a system for allowing players to transfer wagers between opened groups.

According to another embodiment, there is provided a system that allows players to play the first mode of the interactive lottery game: random group play by wagering at least one cent into opened groups.

According to another embodiment, there is provided a system that allows players to play the second mode of interactive lottery game: customized group play, chosen by players to pay in full cost of single lottery entry.

According to an aspect, the system allows players to play the third mode of the interactive lottery game: interactive group play, chosen by players in order to transfer their wagers to opened groups according game strategies.

According to another embodiment, there is provided a method for allowing players win or lose simultaneously if the group wins or loses.

According to another embodiment, there is provided a method of payment to players' member of the winning group based on the players' wager percentage in the winning group.

The system and method described herein increases players' odds to hit the primary award leading to a more positive outcome for lottery players. Players are more likely to win an award out the pool of funds as many closed groups as they are able to join for the jackpot competition.

These and other advantages and features of the present embodiments will become apparent, and the nature of the invention may be more clearly understood by reference to the following detailed description of the invention, the claims, and the drawings appended hereto.

DETAILED DESCRIPTION

Figure 1:
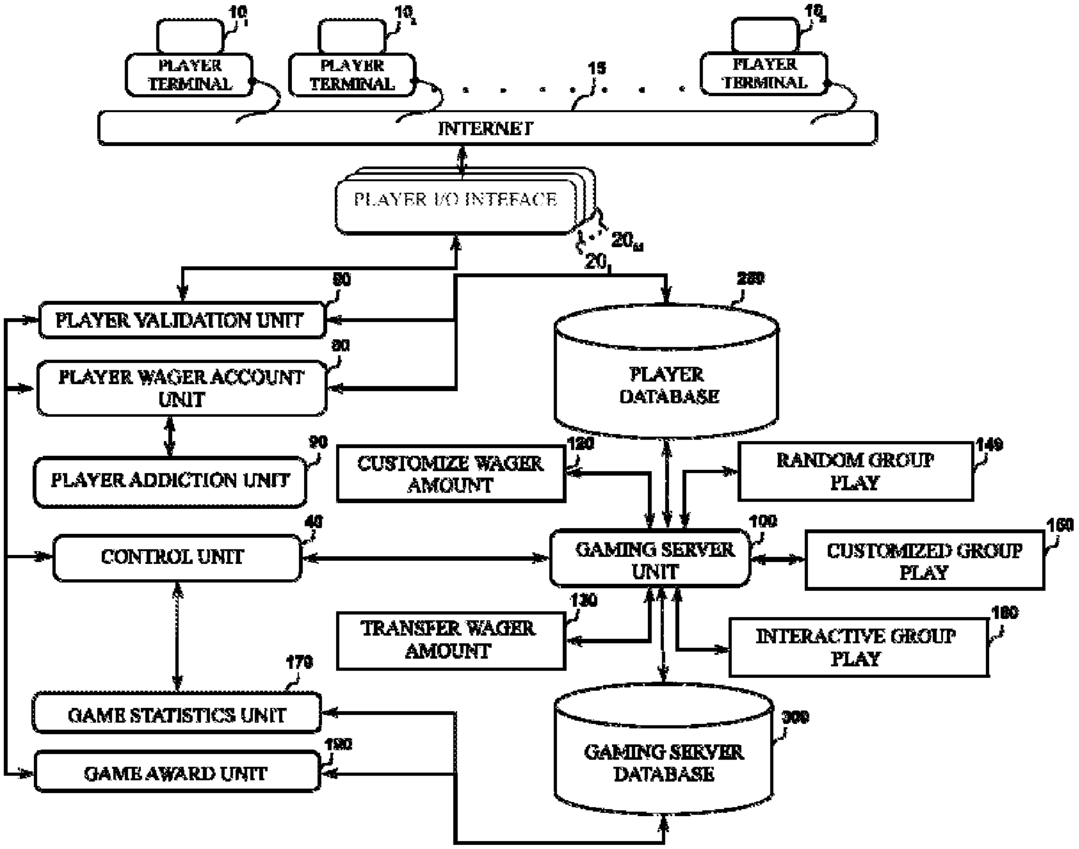
FIG. 1 is a block diagram of a system consistent with an embodiment.

Embodiments of a system and method that allow lottery players to share the jackpot among plurality of players connected to a worldwide network, such as the Internet, and a computer-readable recording medium storage and gaming unit are explained below in detail by referring to the accompanying drawings FIG. 1 illustrates the architecture supporting the method and system of the interactive lottery game according to an embodiment. According to an embodiment, a gaming unit 12 comprises a control unit 40 which comprises one or more World Wide Web (www) servers controlling access to the gaming server database 300. The control unit 40 executes a series of codes or runs specific programs invoking routines that provide the overall functionality of: a player validation unit 50, a player wager account unit 80, and a player addiction unit 90. In addition, the control unit 40 is also connected to one or more gaming server units 100 comprising modules for at least three modes of gaming: random group play module 140, customized group play module 150, and interactive group play module 160. Each mode of gaming uses two additional modules: a) customized wager amount module 120, and b) transfer wager amount module 130. According to an embodiment, the interactive lottery game system comprises a game statistic unit 170 and a game award unit 190 as part of overall interactive lottery game system and method of the present application.

According to an embodiment, players use personal portable devices (e.g., iPods™, iPads™, iPhones™, Blackberry™, Android™ devices, smart phones, personal computers, etc.) $\mathbf{10}_1$, $\mathbf{10}_2$, . . . , $\mathbf{10}_N$, for connection to a worldwide network, for instance, such as Internet 15. Players access the gaming unit 12 from their portable devices and once there control unit 40 retrieves the content appearing in the welcome webpage from the gaming server database 300. The content is shown to players by means of a series of input/output web pages $\mathbf{20}_1$ (see FIG. 3). Such initial web pages contain a plurality of information about rules, game strategies, game statistics, number of players connected, past winnings groups, player registration as well as player sign up and sign in hyperlinks. A player, after clicking on the sign up hyperlink, is directed to a subscription module (not shown). The control unit 40 returns the control to the player validation unit 50 and the later verifies the player's eligibility to play the interactive lottery game according to the lottery game, rules and jurisdictions. When the registration is completed successfully, players require a minimum deposit equal to the cost of the single lottery entry in the player wager account unit 80 before starting the interactive lottery game. If the deposit is not made at this time, players may chose to return at any other time and fill his/her wager account. Once the deposit is made, access to three modalities of interactive lottery game is granted. Players may choose random group play module 140, customized group play module 150 or go directly interactive group play module 160 by wagering in groups opened by other players. Two additional modules allow players to customize wagers within their opened groups (customize wager amount module 120) or alternatively transfer such wagers between opened groups (transfer wager amount module 130). The wager transfer occurs during the wagering period and it is not restricted to the player's opened groups. Players can transfer their wagers from their opened groups to other players' groups. The wagering time is the elapsed time for players to place wagers into opened groups, transfer wagers from one group to another before the jackpot draw. A game statistics unit 170 determines the game statistics and the game award unit 190 determines players' payouts.

The following is an example of application of an embodiment of the presently described method and system.

In this example, player B is a Canadian resident or citizen living in British Columbia, Canada and rather than playing passively the 6/49 lottery game, she/he decides to play an interactive version of the 6/49 lottery game. Upon successful registration, player B is entitled to open a wager account making a minimum deposit of two dollars (the player wager amount) into the player wager account. The player can select from a plurality of payment methods: credit card, bank deposit, direct payment, by phone, or any other method which is suitable and approved by the lottery agency.

In order to play interactively the two dollars, player B has the alternatives listed hereunder.

Player B using the first mode of play can open random groups (entries) by wagering one cent (or another amount) in each group. Hereafter this kind of wagering is referred as uniform wagers because the total amount is split evenly among opened groups.

Alternatively, Player B can distribute the two dollar in a non-uniform manner by customizing the wager specifically for each group (second mode of play). Let's say $1.50 is assigned to one group labelled G300PK150, another 20 cents in another labelled G300PK20 and the last 30 cents in another labelled G300PK30. Afterwards, player B can sit back, wait for incoming wagers from other players and hope that by the game deadline, these three groups will be closed by other players. It is up to player B to wait for incoming wagers or to make the decision to transfer wager amounts from less wagered groups to highest ones or even to transfer those wagers to other groups where player B has not placed any wager yet.

Player B can decide at any moment to transfer wagers of G300PK20 and G300PK30 above to the original G300PK150 group during the game period. In such a case, Player B closed a G300PK group and she/he is the absolute owner of the group. Let's say that the closed group is labelled G300PK having a list of numbers: 34 03 40 39 15 24 and that group matches the winning number (aka the winning outcome or the draw result) as drawn by the lottery agency. In that case player B is the absolute owner and receives the entire jackpot. It should be noted that a combination of symbols (e.g., alphanumeric and/or icons) are associated to a group. This is different from the group identifier which is unique; that is, homologue groups are groups which have the same combination of symbols, but a different group identifier. The combination of symbols is that which is used to compare to the draw result to determine if a group is a winning group.

Alternatively, Player B using the third game mode can search the network for groups already opened by: i) group rank; ii) player rank; iii) amount left; or iv) by likelihood to be closed. Then, player B can transfer partially or in full those wagers described in first and second alternatives in new groups opened by other players. Player B can transfer wagers placed in these new groups at a later time as long as the source groups subject to transfer have not been yet closed. In theory, using alternatives discussed above, player B can close up to 200 hundred groups investing only two dollars.

In some circumstances, player B may want to reopen groups that have been closed by previous player wagers by creating homologue groups. The system creates and tracks these homologue groups and they are also winning groups if their identity matches the draw result as issued by the lottery agency.

Alternatively, player B instead of creating random groups she/he decides to open and close a group by wagering in full the two dollar amount that cost a single entry. In case of player B becomes the absolute owner of the group. In that case, player B is playing in a traditional manner using the Internet in order to purchase the ticket from home instead of going physically to the authorized retailer. This strategy is not time sensitive because players can use it at any time during the game period.

Upon ending the wagering period, all closed groups are associated to a unique identifier based on the day, the time the group was closed and group members. Other methods of associating a unique identifier are also possible. For example, the identifier could be similar to those of a 6/49 tickets (a series of numbers). Another example is simply to assign a random number, a series of letters, symbols or combination thereof. Every time a group is closed, the lottery houses may proceed by automatically or mechanically issuing these identifiers to players. Once the official winning number is released, the interactive lottery game players are notified about their odds.

If one of the groups closed by player B matches with the winning number, the prize is allocated to Player B according to the wager placed (i.e., the percentage the wager represents relative to the total amount necessary to close a group; that is, the group total wager) into the winning groups. In the event that the winning number has homologue groups, then the prize is split first evenly between homologue groups and then prizes are allocated to players according to the wagers placed into winning groups.

The interactive lotto game offers a unique advantage to lottery players to take control of their wagers and therefore their odds. Neither passive nor instant ways of lotto playing can provide such an opportunity to players.

Note that advanced players may need to invest only $2 dollars and have same chances to win as those players investing $20 in the passive way of playing lottery. The slight difference is that the passive player is the absolute winner if his/her group matches the winning number whereas the advanced player gets only a percentage of the jackpot prize if one of his/her closed groups matches the winning number. The interactive lottery game provides players full control of their money upon purchasing the entry. The interactive lottery game gives more incentive to lottery players thereby providing an opportunity to increase ticket sales by houses.

It should be noted that a winning outcome can be interpreted in a variety of manners. A draw result consisting of a combination of symbols (alphanumeric and/or icons) is an example of a winning outcome. Other examples of a winning outcome include the result of a race (horse, car, human, etc.), a boxing gala, a sports event or tournament (results of basketball games over a given period), etc.

Figure 2:
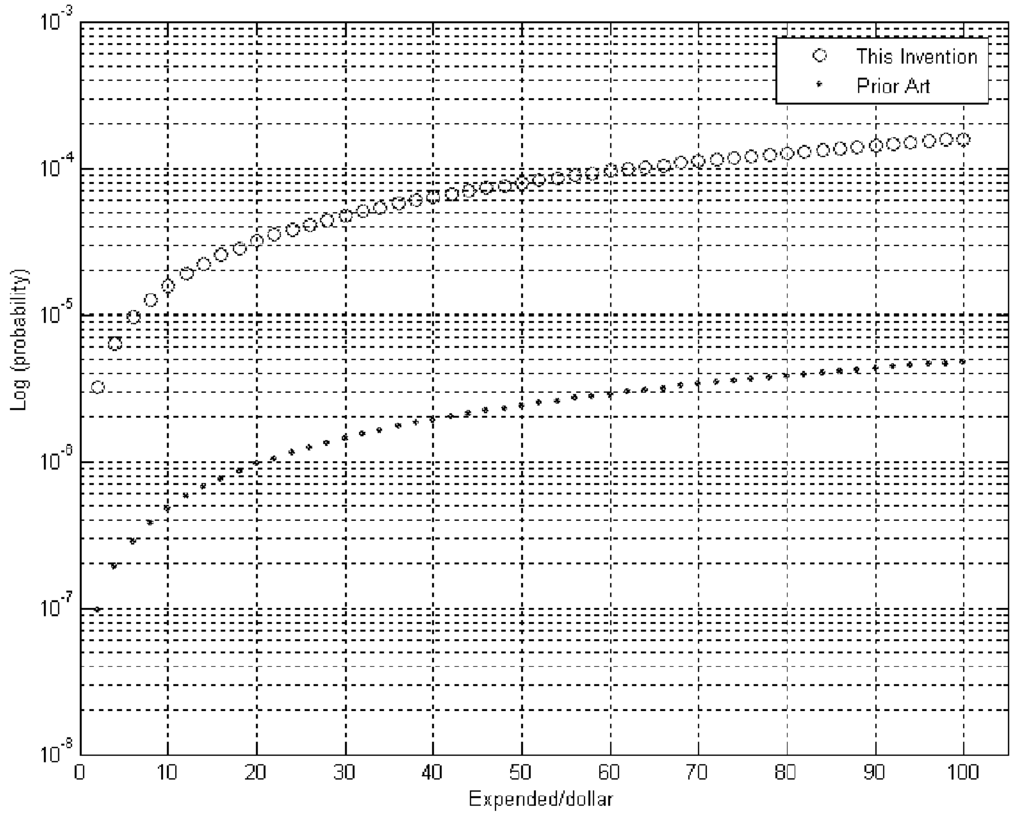
FIG. 2 is the probability to hit the jackpot by dollar spent.

FIG. 2 summarizes the player's probability of winning for prior art systems (dots) and for the interactive lotto game (circle) as a function of the wager amount spent. The probabilities were taken in log scales for better representation.

The probability of the prior art systems of i-th player is determined as P(i)=(3×number of plays)/13,983,816 is all possible unrepeated combinations of collocation 6 numbers in a pull of 49.

On the contrary, the probability to hit the jackpot from the interactive lottery game is higher because it takes the advantage of group play and further reduces the cost of a single lottery entry to one cent and allowing other players to place wagers to complete the cost of the single lottery entry (group total wager). Hence: P(i)=(100×price of lotto)/(49,6).

There are three main conclusions that can be drawn from FIG. 2:

Firstly, interactive lottery game does not change the random character of the traditional lottery game because both probabilities are similar in fashion.

Secondly, the interactive lottery game at any point in the x-axis, i.e., dollars spent, provides an increase, at least one order of magnitude, of players odds; and Thirdly, more players may be interested in playing the interactive lottery game and therefore houses may able to sell more lottery tickets providing higher jackpots compared to the traditional way of playing.

Lottery tickets may reach exceptional sale records because in addition to existing customer a new stream of players would be engaged in the interactive lottery game. Generally, existing lottery games do not take the full advantages of fast growing online customers. The interactive lotto game targets this fast growing market, where people are computer savvy and making quick decisions online, etc.

Even though the interactive lottery game represents higher return for players its odds remain extremely low. For instance, let's say player B decides to play $10 during a particular game period. Theoretically, the interactive lottery game offer the possibility to close up to 1000 (10×100) groups with a small investment of $10. Nonetheless, his/her odds to hit the jackpot remains as low as $1000/13,983,816=7\times10^{-5}$. The more money players put into the interactive lottery game, the more difficult it becomes to close those opened groups. Thus, houses, no matter the circumstances and the game strategies developed among players, always win.

As described above the interactive lottery game defines a new mode of play lottery tickets. Therefore, any of the existing lottery games can be played interactively using the system and the method described herein.

Having thus described the functionality associated with one or more aspect of this disclosure in general terms, specific details of the game functionality are now described.

Figure 3:
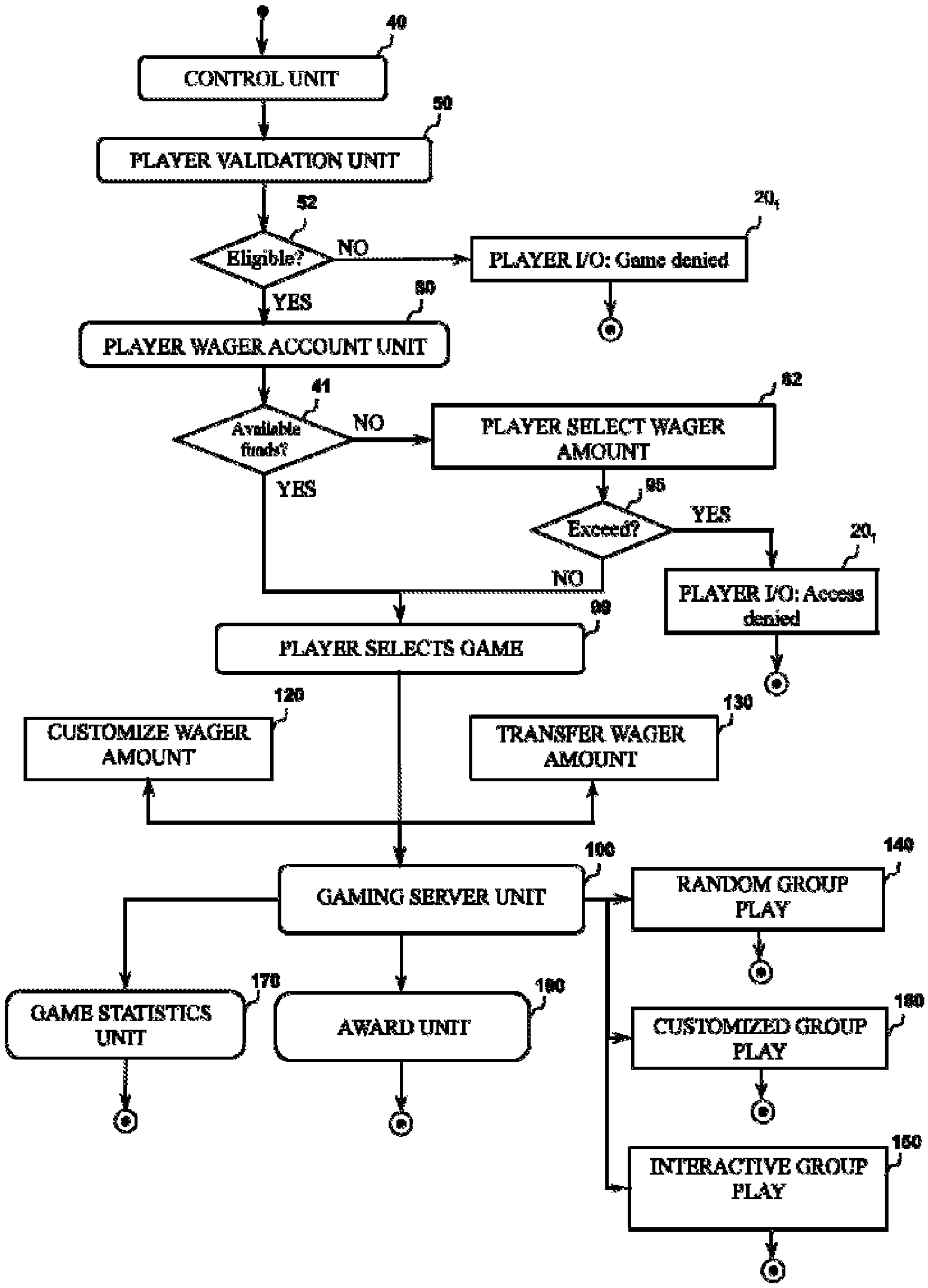
FIG. 3 is a main flowchart of the embodiments.

Referring now to FIG. 3, the main flow of execution of three embodiments is shown. In one embodiment, in order for a player to participate in the interactive lottery game, a validation process is required. The validation process runs after players click on the sign up hyperlink. A this moment, the control unit 40 runs a series of computer code invoking the player validation unit 50, which verifies a player's eligibility to play the interactive lotto game.

In addition in module 52 a Boolean query is run to grant the access to the player wager account unit 80. If the player does not meet the lottery requirement, the control unit 40 returns a message through input/output web interface of game denied $\mathbf{20}_1$.

Upon successful sign up of a player the control unit 40 transfers the control to the player wager account unit 80 to verify the availability of funds. Each lottery game may have a different unit price. For instance, the cost of a single entry in the lottery 6/49 is two dollars. Thus, if players want to play 6/49, it must have at least two dollars in his/her wager account before starting the interactive lottery game.

The module 41 returns the control to control unit 40 in case players do not have enough funds and module 82 executes routines in order to allow players to refill its wager account.

The module 95 determines whether or not the new deposit exceeds the addiction value. If the addiction value has not been reached, then the player wager account if refilled with amount specified by the player.

Once players complete these steps, the player wager account unit 80 returns the control to 40 in order to the player select kind of lotto he/she wants to play in module 99. Otherwise the control unit returns through player output $\mathbf{20}_2$ a message of game not granted.

According to an embodiment, the module 99 select automatically eligible lotteries players may play according with player location, lotteries rules and jurisdictions.

After a player makes her/his selection of kind of lotto the control unit 40 returns the control to the gaming server unit 100 as described in the three embodiments later on in this disclosure.

After the wagering period ends, those player closed groups are automatically updated in the gaming sever data base 250 and granted automatic access to enter for the competition of the jackpot.

According to an embodiment, the game statistics unit 170 provides the overall game statistics. The game award unit 190 provides, in another embodiment, player payouts as described in detail in the three embodiments.

Figure 4:
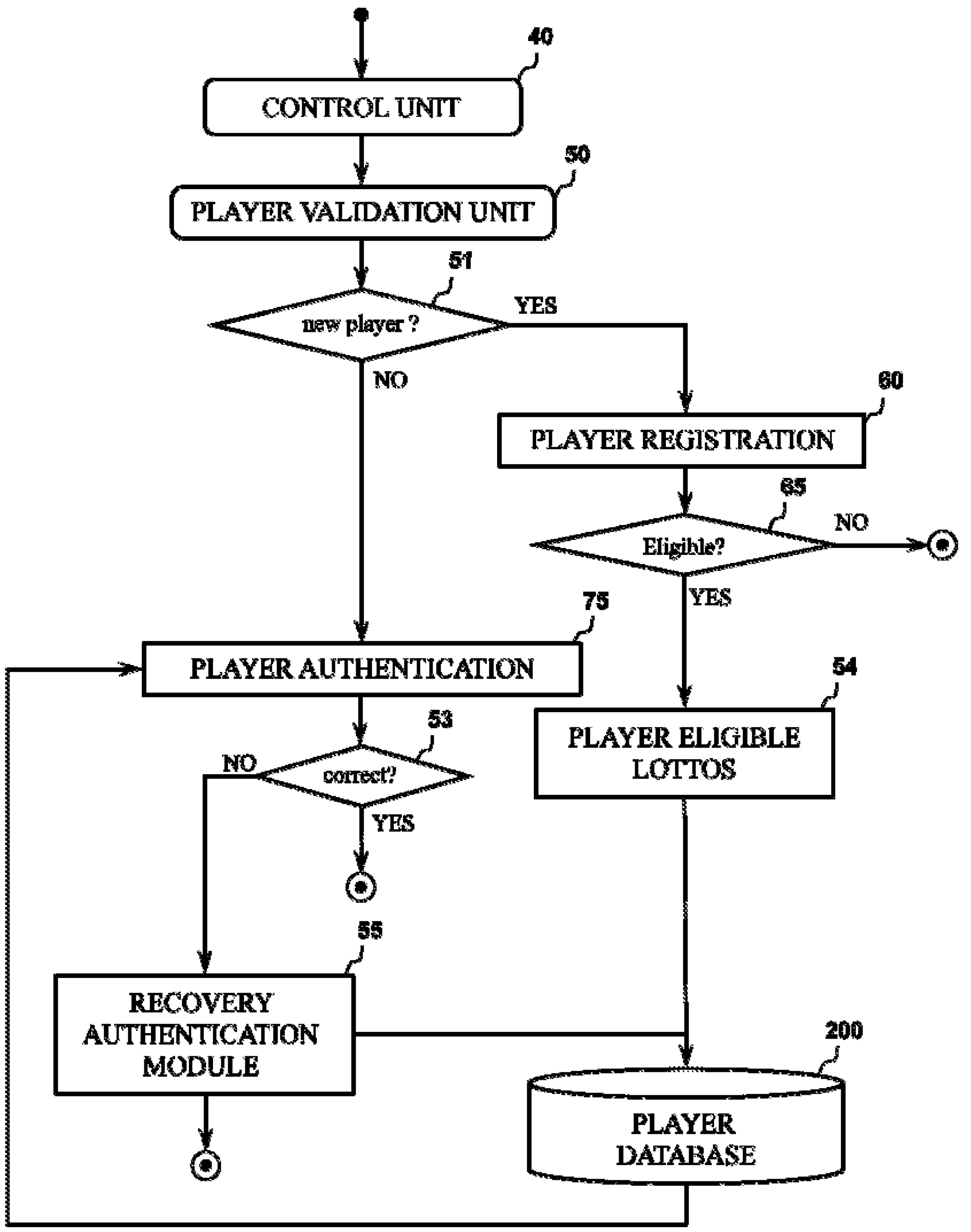
FIG. 4 is a flowchart of execution of the player validation unit according to an embodiment.

Referring now to FIG. 4, the step 51 is invoked by the player validation unit 50 in order to validate players' registration. In case of a registered player, the secret identification code and password are collected by authentication box provided by SSL encrypted web pages. Upon a player clicking on a the sign in box, the control unit 40 requests to the player validation unit 50 for confirmation of the player's secure identification code and password by executing an internal procedure 53 loading the player's information from gaming server database 300.

Registered players may choose to enter their user identification through a player authentication module 75. In the event of incorrect data entry the player validation unit 50 turns the control to a recovery authentication module 55 to verify whether the information entered was misspelled or in case either the password or user ID was forgotten. The recovery authentication module 55 allows players change the authentication data after correct personal information is provided when the registration processes is provided.

In case of a new player, the step 51 turns the control to the player registration module 60, explained in the embodiment described below. Then step 65 determines based on the personal data provided by the player whether the player is eligible or not to play the interactive lotto game.

In case it is determined that the player is not eligible, the execution of player validation unit 50 ends and it returns the control over control unit 40. In the case when a player is eligible, another module 54 is invoked for the player to select lotteries he/she wants to play.

Figure 5:
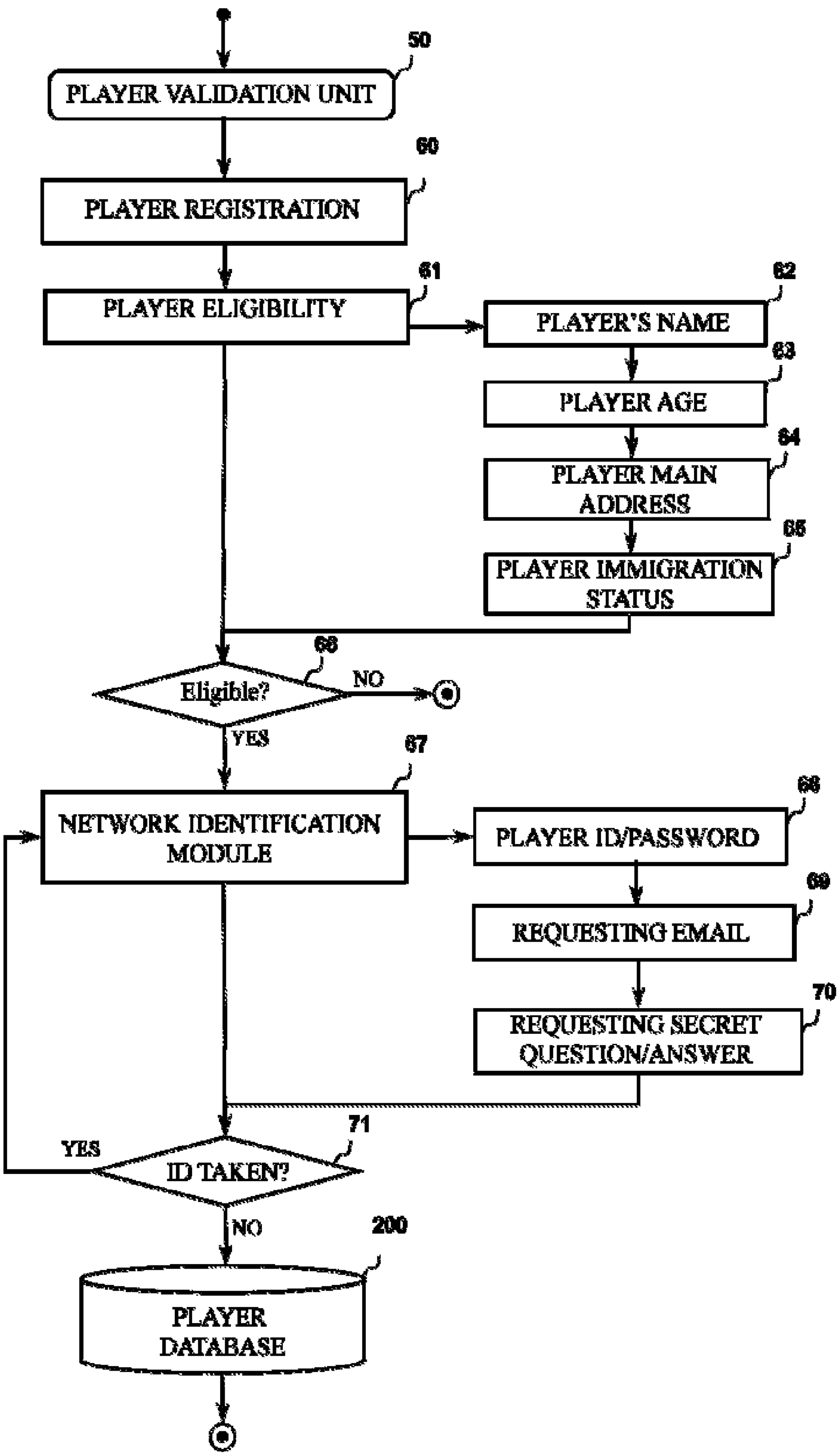
FIG. 5 is a flowchart of execution of player registration unit according to an embodiment.

Referring now to FIG. 5, the player registration module 60 is called by player validation unit 50 after the player clicks on the sign in box or hyperlink. Then, the control unit 40 loads an SSL webpage to collect the player personal information.

According to an embodiment, player's registration module comprises a plurality of mandatory web forms including but not limited to: player's name 62, player's age 63, player's address information (city, country, postal code) 64 as well as player social insurance number 65 (immigration status).

An internal subroutine 66 determines whether the entered player information meets the requirements and the rules of the selected lottery. The control of the system is returned to the control unit 40 in the case where the player does not meet lotto requirements.

In the case when the player meets the lottery requirements, she/he is redirected to the network identification module 67 that requests a unique player's identification into the portal, which includes but is not limited to: identification code and password 68, player's email 69 and secret question and its answer in subroutine 70. When the identification code provided by the player is accepted, the subroutine 71 returns the controls once again to the network identification module 67 in order that the player repeats the identification process. In the event that the user identification selected by the player is already taken, a subroutine 70 returns the control to network identification module 67 and players are requested to complete the process once again for new identification. Both personal and network identification is transmitted through SSL web pages and stored in the player database 250.

Figure 6:
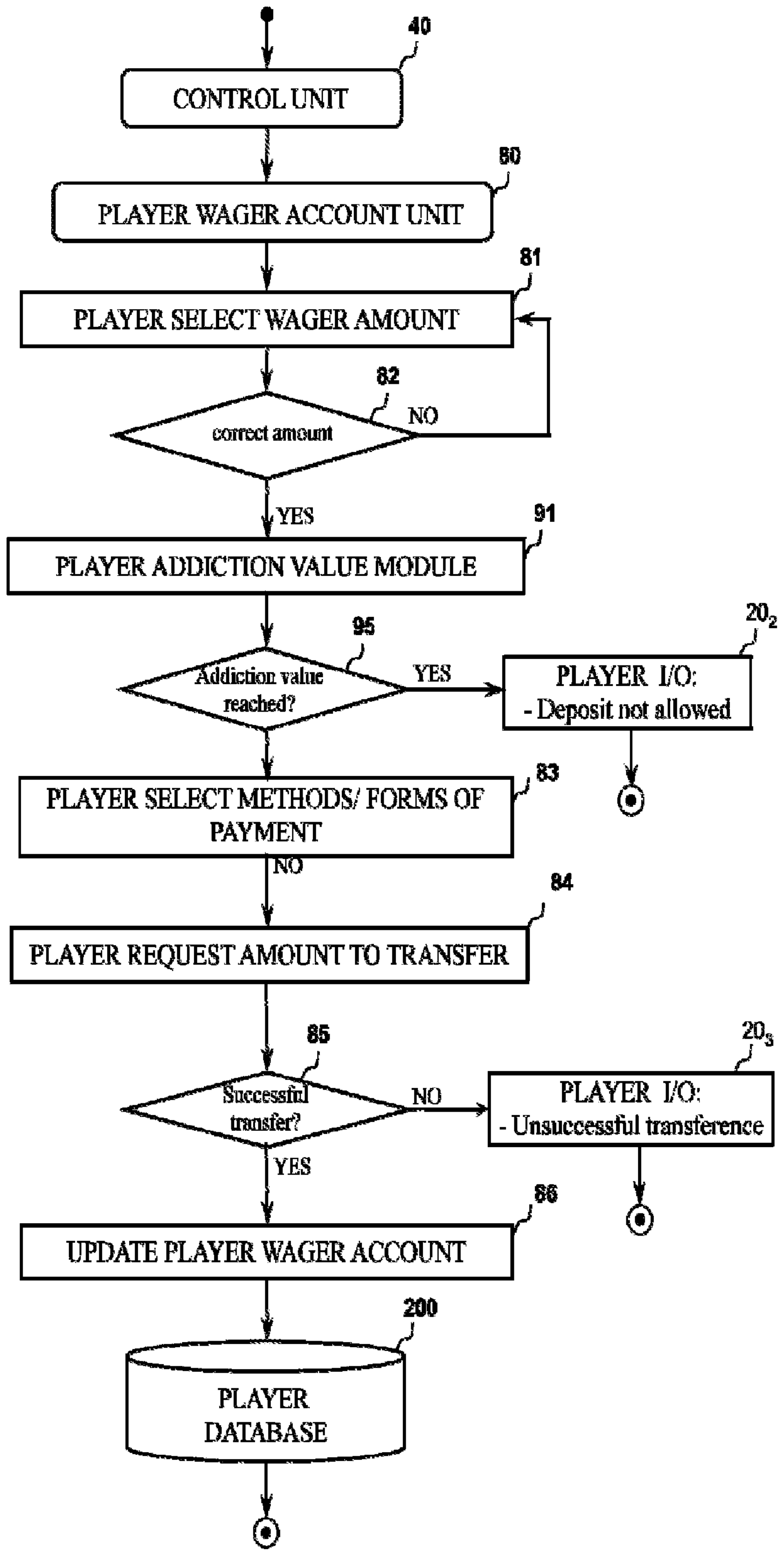
FIG. 6 is a flowchart of execution of the player wager account unit according to an embodiment.

Referring now to FIG. 6, the flowchart for validating deposits into player wager account is shown. The player wager account unit 80 is invoked when the control unit 40 receives a request from players to fill or refill his/her wager account. The module 81 allows players to select the specific wager amount to be deposited.

The amount is validated against mistyping in the module 82. In the case of negative amount, zero or non-numeral character, the module 83 returns the control to module 82 for the player to re-enter a valid amount. Furthermore, in order for the deposit to be granted, a second verification is mandatory as described below. In case the amount requested exceeds the player addiction value, the module 95 returns a message through player output $\mathbf{20}_2$ to indicate that deposits are not allowed.

The module 95 grants a new deposit depending on whether or not the new deposit exceeds the player addiction value. If the new deposit does not exceed the addiction value, the requested deposit is granted an encrypted webpage is requested by the control unit 40 to collect both method and form of payment from the player.

The authorization and verification of the amount to transfer is carried out by the module 83 by requesting to the merchant credit provider an authorization to subtract, from the player's method of payment, the amount specified by the player.

A subroutine 85 determines whether or not the transfer was successful. In the case when the transfer is not successful, the player is notified through a player I/O message and the control is returned to control unit 40.

In case of successful transfers, the player wager account is refilled with the specified amount and it is automatically updated in the player database 250.

Figure 7:
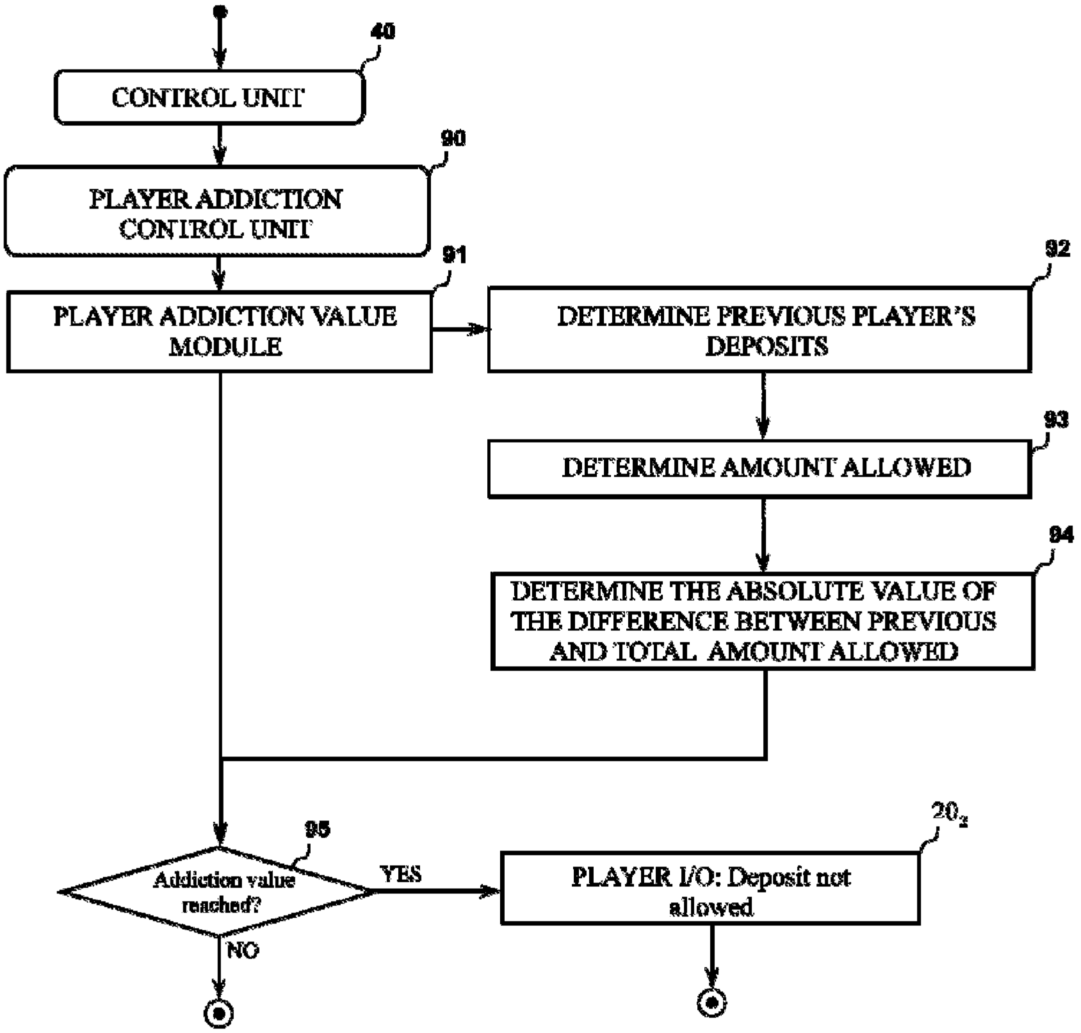
FIG. 7 is a flowchart of the player addiction unit according to an embodiment.

Referring now to FIG. 7, the flowchart to determine the player addiction value is illustrated.

According to an embodiment, the player addiction unit 90 is invoked after a player request of a new deposit to be made in his/her wager account. The player's addition value is determined in module 91 prior to granting the new deposit. First, the current deposit of the i-th player $T_i^A$ is calculated in module 92 by adding up all previous amount deposited by:

$$D_i^A = \sum_{j=1}^{v} A_j \tag{1}$$

where $A_j$ is the amount deposited in the j-th occasion out of the total v-times (i.e., v=1 for the first time deposit).

Secondly, module 94 calculates the deposit allowed to the i-th player, $D_i^N$, the difference between the maximum deposit allowed per period of time $T_d$ and the current deposits of i-th player $D_i^A$ gives:

$$D_i^N = (T_d - D_i^A) \tag{2}$$

In module 95, it is determined whether or not a player's new deposits $D_i^N$ are allowed. If $D_i^N$ is greater than zero, the new deposit is allowed otherwise the module ends by displaying that no further deposits are allowed at this time. When a player passes a successful validation and meets the minimum deposit in his/her wager account, then the access to the interactive lottery game is granted.

During the game period or wagering period, players may customize a wager within a group or transfer the wager to other groups. There are at least two ways for players to take the full advantages of the wagering period: 1) wagering a specific amount into opened groups, referred in the specific embodiment as customize wager amount module 120 as depicted in FIG. 8; and 2) transferring wagers from player opened groups to other groups, referred in the specific embodiment as transfer wager amount module 130 as depicted in FIG. 9.

Figure 8:
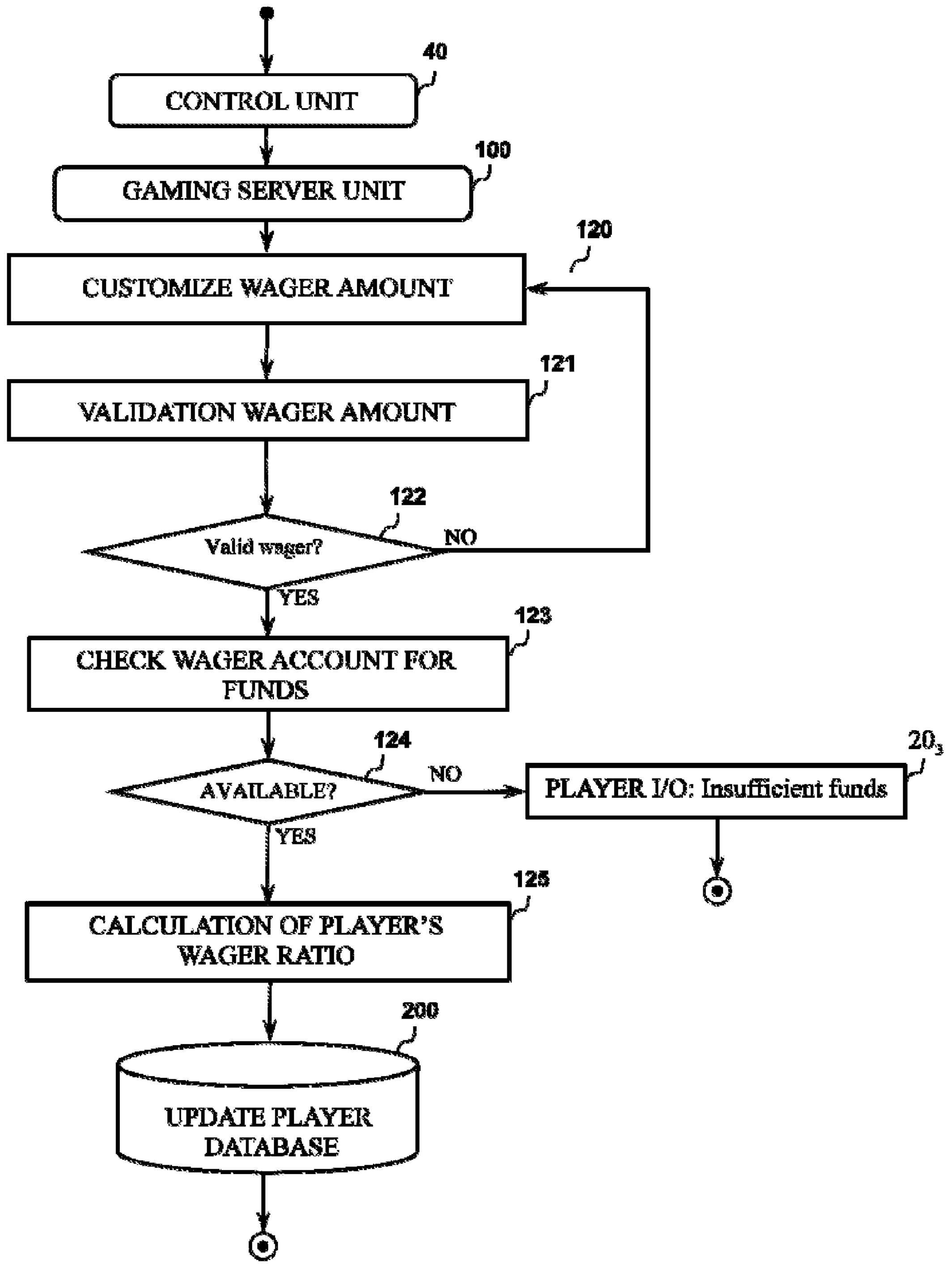
FIG. 8 is a flowchart of player customize wager amount according to an embodiment.
Figure 9:
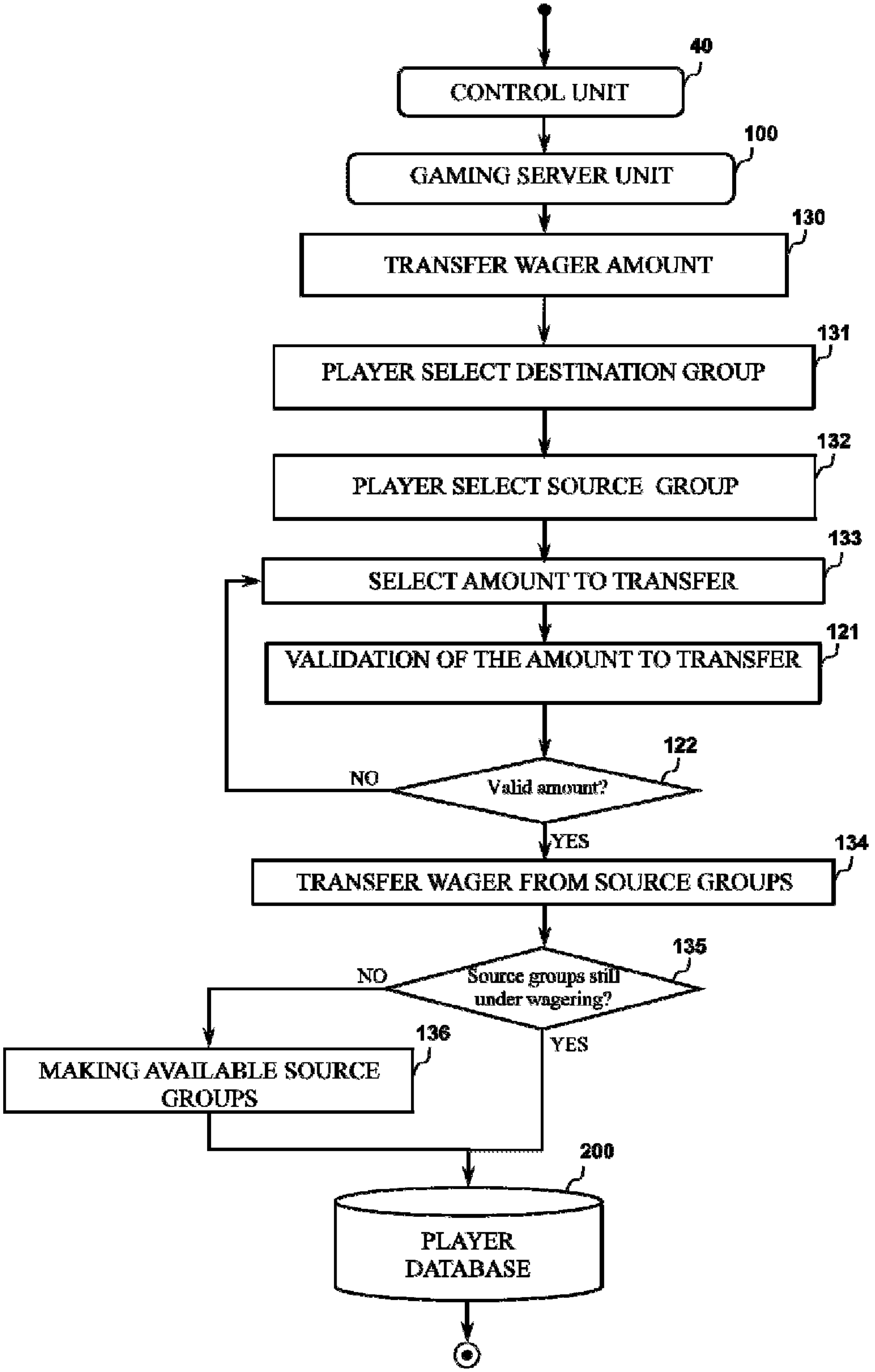
FIG. 9 is a flowchart of player transfer wager amount according to an embodiment.

Referring to FIG. 8, there is illustrated the flowchart of how players customize wagers within specific groups.

Players may query the gaming server unit 100 for opened groups and place customized wagers into them 120. Wagers placed by players are validated against typos, negative signs and further typographical errors by module 122. The amount of valid wagers is automatically deducted from the wager account. The module 124 checks whether or not there are sufficient funds to complete the wagers requested by players. A message of insufficient funds is displayed to players in case there are not sufficient funds to complete the requested wagers $\mathbf{20}_3$. The percentage of a player's wager in the group is calculated by dividing the wager by the cost of the single lottery entry played and multiplying the result by one hundred in module 125. Otherwise, the module 122 accepts the new wager and it turns to the control to module 123 for verifying whether or not the player has enough funds to cover the new wager. In case of i-th player has enough funds, the module 124 gives the control to module 125 to recalculate the wager ratio of i-th player has into the k-th group at the time is playing the L-lottery, yields to:

$$(R_i^k)_L = \frac{\sum_{l=1}^{N} W_{l,k}}{W_T} \tag{3}$$

$$0 \le (R_i^k)_L \le 1$$

where $W_{l,k}$ is l-th time the i-th player has placed a wager into the k-th group and $W_T$ is the price of the single lotto entry. N accounts for the number of times the player has placed a wager into the k-th group. Then, the new player wager ratio value is updated in the player database 250. It is easy to verify if players have placed a wager covering the full amount of the cost of a single lottery entry into the k-th group then Equation (3) yields to $(R_i^k)_L=1$.

In case the k-th player does not has enough funds to cover the wager, module 124 returns the control to the gaming server unit 100 and show a message to the player of insufficient funds to cover the current wager. A new identifier for this group is created for the player and an update of its status and the percentage wagered is updated in the player database 200.

FIG. 9 illustrates the flowchart of how players customize wagers within specific groups.

Upon a player selecting the specific wager amount they want to transfer 130, a source group at step 131 and destination group at step 132 need to be specified. Upon a player's selection of specific wager amounts to be transferred, the validation of the wager amount is conducted by module 122. The total wager amount, $W_i^k$ of i-th player in k-th group is calculated by adding up its previous wagers into the group yielding to:

$$W_i^k = \sum_{i=1}^{M} A_{i,k} \quad (4)$$

where $A_{i,k}$ is the wager amount of i-th player in k-th group and M is the total number of players with wagers into the k-th group. Then module 122 calculates the wagers that k-th group accepts at the moment:

$$W_k^a = W_T - W_l^k \quad (5)$$

where $W_T$ is the cost of a single lotto entry as regulated by lottery agencies. Thus, module 122 verifies if the new wager entered is greater than zero and less or equal than $W_a$, within the range of $(0<W_k \le W_k^a)$. If the new wager received in k-th group is not in the above range, the module 122 returns the control to 133 to i-th player to re-enter a new wager amount to be transferred. Players at this moment might decide to refill the account as described earlier and then repeat above steps one more time.

Alternatively, players may use a second way of wagering by making transfers from their opened groups to other groups still under wager. In such a case, gaming server unit 100 transfers the control to transfer wager amount module 130. In step 131, the search is conducted by player opened groups by specifying wager ranges, game statistics and the like.

The above query returns a player's groups sorted from the highest wagered group to the lowest wagered group. Players at any time might narrow the search by specifying another amount. In step 132, player performs another query but this time for searching for destination groups. When both source and destination groups are selected the player selects the specific wager amount to transfer in module 133.

In step 121, the wager amount that a destination group receives is calculated as described above and the acceptable wager amount is determined as in Equation (5) above. Moreover, the validation of the wager is carried out by module 122.

In case of successful validation, the wager into the destination group is accepted in step 134 and in step 135 it is determined whether or not wagers are left in the source group. If it is available for wagering, either by the player requesting the transfer or other players, the source group accepts further wagering and player groups are updated in the player database 250. In case source groups are no longer under wagering, then the gaming server unit makes them available.

In the first embodiments described herein, players open groups generated randomly by the gaming server unit. According to an embodiment, players open random groups by specifying the total number of group desired and the total amount to wager. Then the gaming server unit opens and stores in the player database both random groups and the wager placed in player opened groups.

Figure 10:
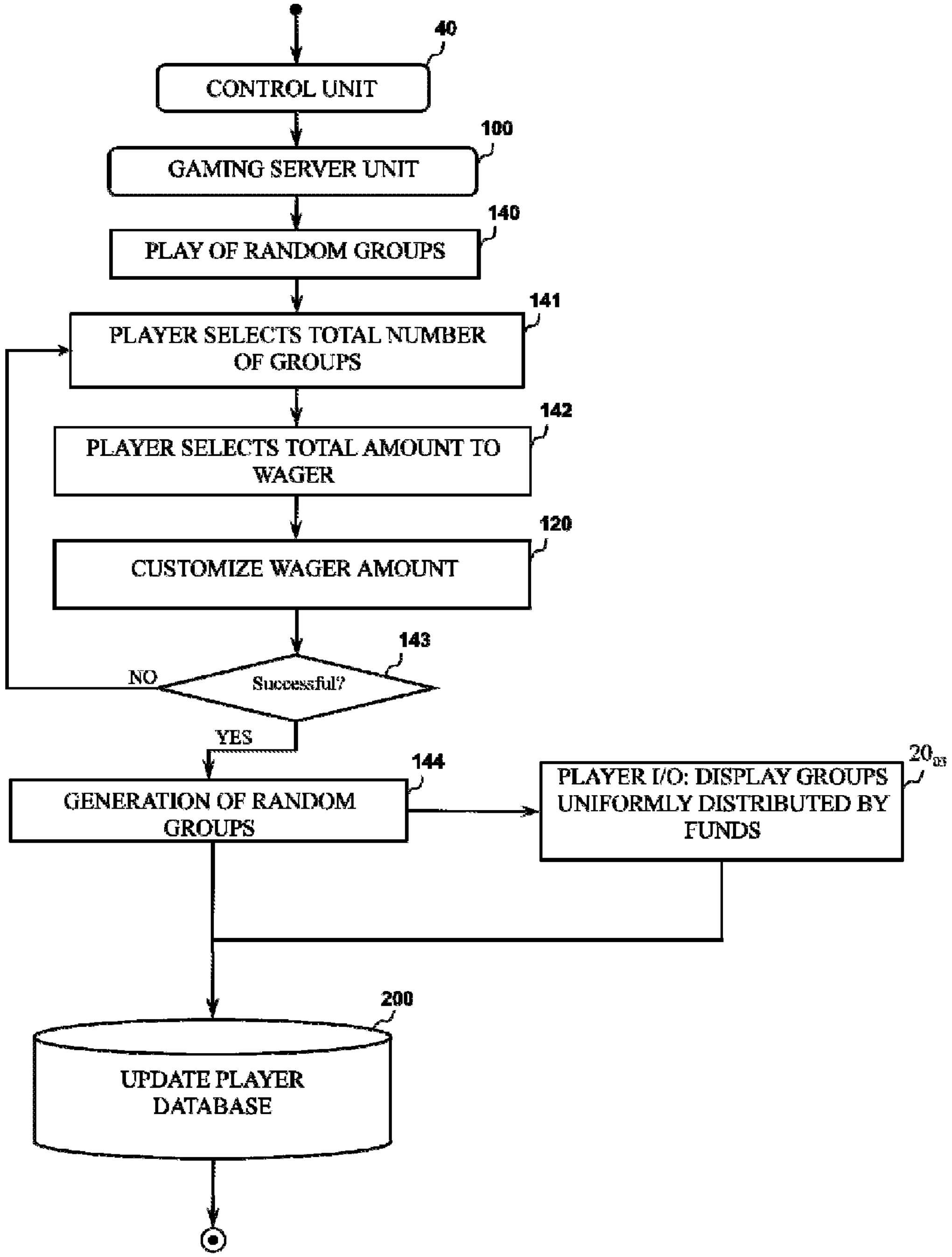
FIG. 10 is a flowchart of a random group play embodiment.

FIG. 10 is a flowchart of a first embodiment is shown.

According to FIG. 10, the control unit 40 gives the control to the gaming server unit 100 whenever players want to play the first mode of interactive lottery game and open random groups.

The player starts playing random groups by specifying first the total number of groups. Module 141 enables players to enter in a combo box the total number of groups. Then, another combo box appears to specify the total wager amount, which is collected in module 142.

In the next step, customize wager amount module 120 verifies that the entered wager is correct and that the player has enough funds. The total wager is evenly distributed among opened groups and the wager corresponding to each k-th group $W_k^R$ is determined diving total wager amount of i-th player $W_i^T$ by the total number of random groups, $N_R$ yielding to:

$$W_k^R = \frac{W_i^T}{N_R} \quad (6)$$

Subroutine 143 checks whether wagers corresponding to each group greater than zero and less or equal to the price of a single lotto entry, i.e. that $1 \le W_k^R \le W_T$. If $W_k^R$ is in that ranges, then the gaming server unit proceeds to generate a sequence of random numbers at step 144.

The group is formed by a chain of integer numbers. The length of the chain is determined by the specific lottery game a player is playing. Each digit of such chain is randomly generated from one to the maximum number as it is specified by the lottery agency in each type of lottery game.

Once the above operations are successfully completed, the list of random groups and its wagers are shown to the player in a webpage format in module $20_{03}$ and automatically saved in the player database 250.

In the second embodiment of the present disclosure, the gaming server unit 100 allows players to open groups following a player's specifications. In one embodiment, a player types in a combo box the total number of groups to open and in another combo box the total amount to wager in such groups.

In this mode of gaming, players optionally change the amount within specific groups and raise the wager. Groups opened or closed by the player are automatically stored in the player database.

Figure 11:
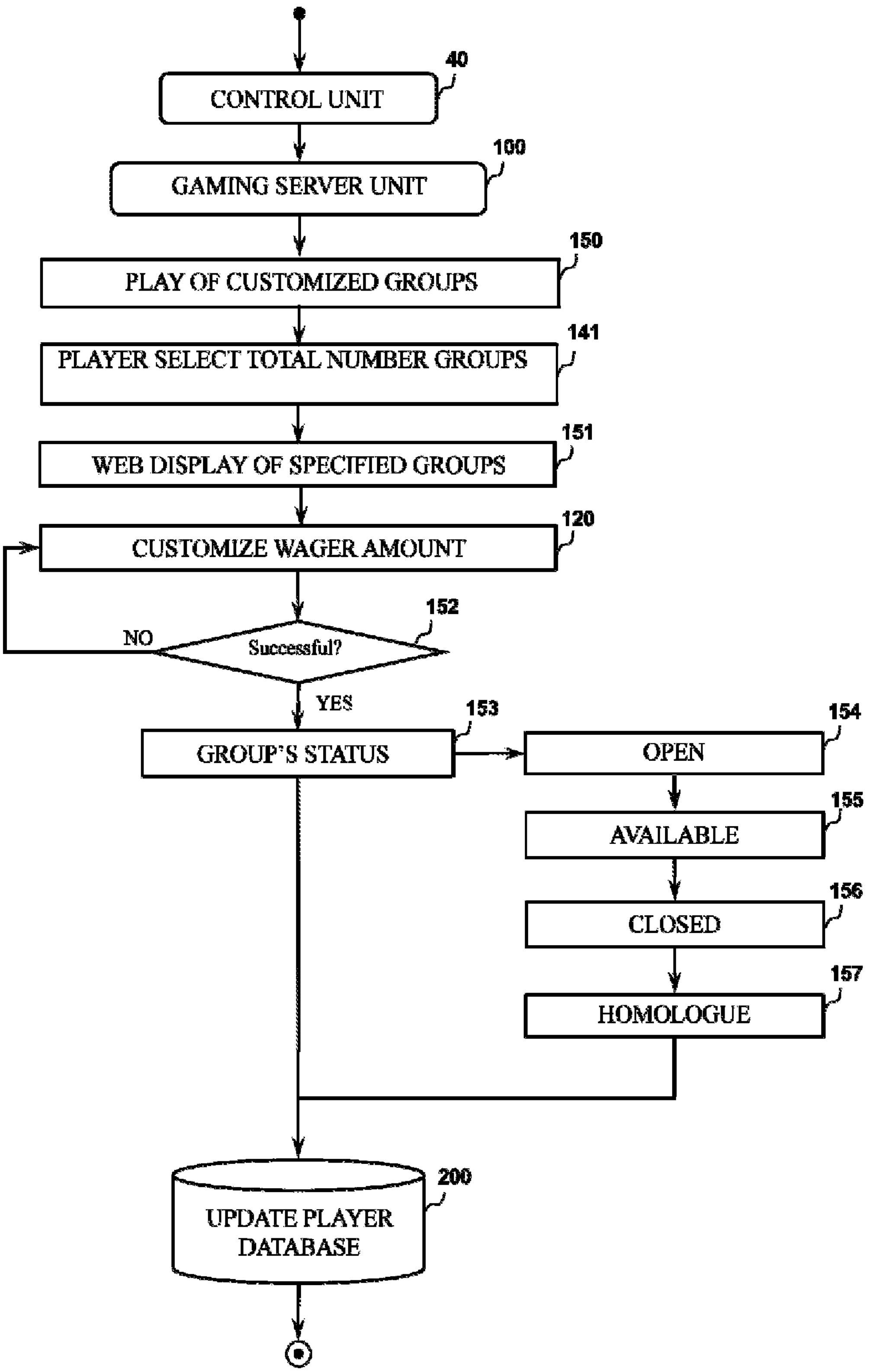
FIG. 11 is a flowchart of a customized group play embodiment.

FIG. 11 illustrates the flowchart of the second embodiment of the present disclosure.

The gaming server unit 100 gives the access to play of customized group play module 150 after a player request.

First, players select the total number of groups they want to open in module 141. According to an embodiment, players customize groups to wager following a web display format 151. Initially groups are set of empty boxes for players entering specific combination of digits within each box. The number of displayed empty boxes to be filled is determined by the lottery game previously selected by players.

Once player select the desired combination of digit within boxes and additional box is shown to the player for customization of the wager amount into selected groups. In customize wager amount module 120 is verified the wager amount is valid and the player has enough funds to cover the wager placed. The subroutine 152 gives the control to 120, in case a wager was not allowed. A player may try to renter another wager amount to succeed.

Before confirming the wager into player's opened groups in module 153 the group's status is determined. At any time players are wagering to specific groups, the gaming server unit 100 might record three different status for the group in question: 1) the group is already opened by other player but yet accept incoming wagers 154; 2) the group is a new and accept the full wager amount to closed it 155; and 3) the group is closed and no more incoming wagers from other player are accepted (box 156).

Once the wager of the player is confirmed, the module 153 shows a web display of the group's status: i) open, and ii) close. Two options appear under i): first, wager only a certain amount while keeping their groups open; and second, wager the remaining amount necessary to close the group.

In case groups under status of ii) a player may have another two options: first, players may open an homologue group at step 157, which is a similar group to one registered in the gaming server unit 100 and wager the full amount or only a percentage in the homologue group; and second, discard the wager made into the homologue group. In this case, players have the choice to transfer the amount wagered to another open group as described in the third embodiment of this disclosure.

In the third embodiment of this disclosure, the gaming server unit 100 allows players to wager customized amount or transfer wager amounts from their opened groups to other opened group. For such purposes, players may query the gaming server database 300 looking for opened groups. Player may sort the result of the above query by: i) amount left of opened groups; ii) player's ranking; and iii) group ranking.

Figure 12:
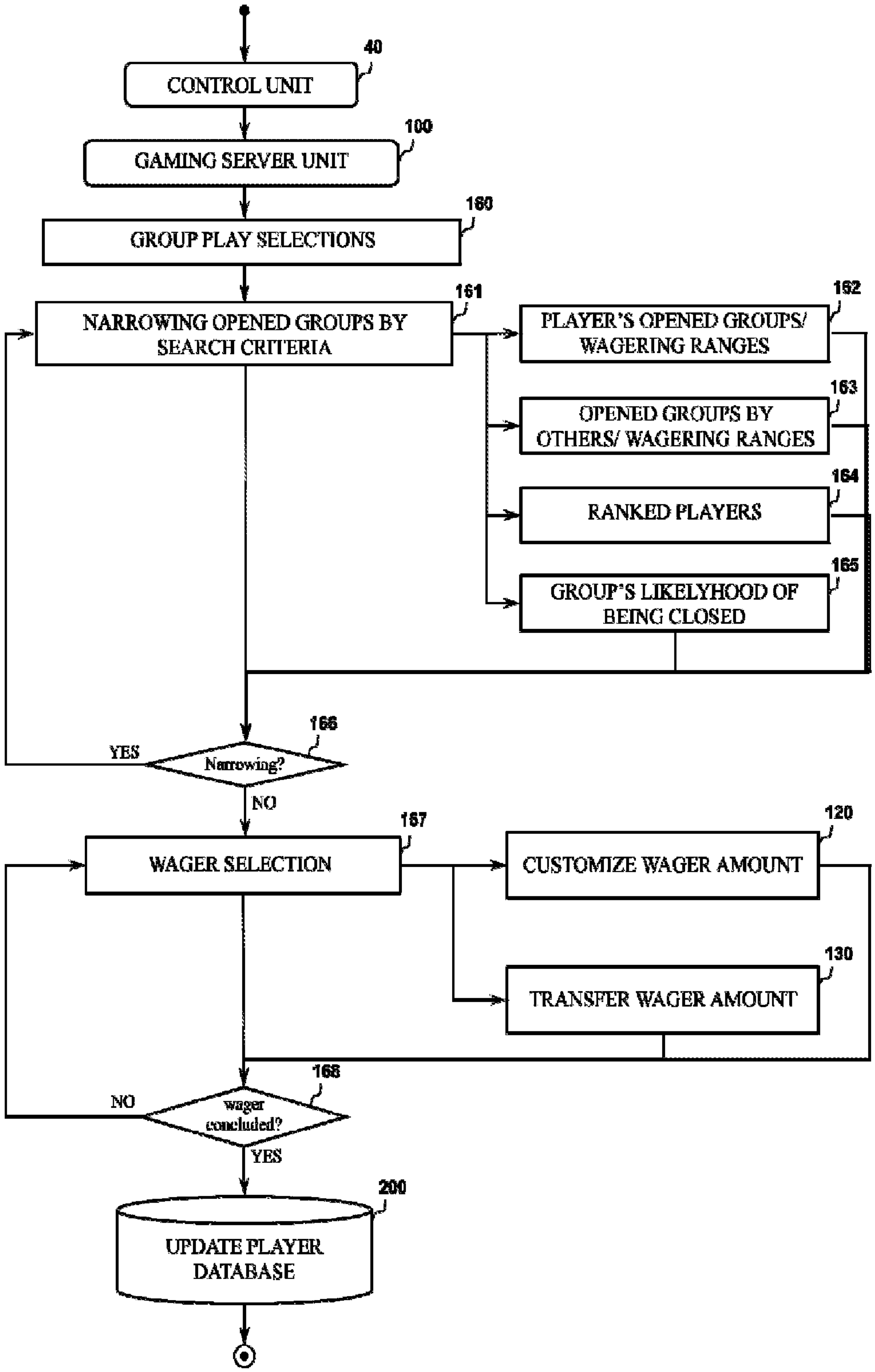
FIG. 12 is a flowchart of an interactive group play embodiment.

FIG. 12 illustrates a flowchart of the third embodiment of the present disclosure.

The gaming server unit 100 gives the control to play group selections after receiving a player request to play this mode of the interactive lotto game. In module 161, the player selects by searching criteria for the opened groups existing in the gaming server database 300. Players may search by wagering amount placed in its opened groups at step 162. Step 162 allows players to narrow the query performed by ascending or descending wager amount left to close groups. Alternatively, players might want to search according to the same criteria as above, but instead in its groups in groups opened by other players at step 163. In such a case, step 163 provides means for narrowing the result of the query by sorting the results in ascending or descending manner.

Previous gaming statistics generate valuable information helping the player to draw the best strategies to close as many groups as possible.

According to an embodiment, players might search opened groups by statistics criteria such as: ranked groups and the likelihood of being closed. In module 164, the ranked groups are determined based on the player's member are holding the highest closed groups in pass game events. An additional module 165 is reserved for correlation statistics. For instance a Bayesian probability to close an opened group subject to an initial wager amount, player's rank, group's rank can be determined.

In step 166, it is determined whether or not players concluded searching for opened groups. At any moment player might change the criteria. Once the player select at least one opened group from those listed, the module 167 is invoked and two additional controls are shown to the player: a wager and wager transfer. The first control allows players to customize the customize wager amount module 120 as described above and the second control invokes a transfer of a wager amount module 130 from the player's group to the group being selected. In case a player selects the wager control, a combo box pops up in order for the player to place his/her specific wager amount.

A player may also transfer wager amounts from its opened group to another group still under wagering. In such a case, the player presses a transfer wager button or icon and the group under wagering is marked as destination group then the player's source groups are automatically requested. Players may search groups by wager ranges to make a selection of source groups. Once the above operations are completed, the gaming server unit update the player's wager account balance and group's status into the player database 250.

According to an embodiment, the gambling portal retrieves for the players, the past and current game statistics through the game statistics unit 170.

Figure 13:
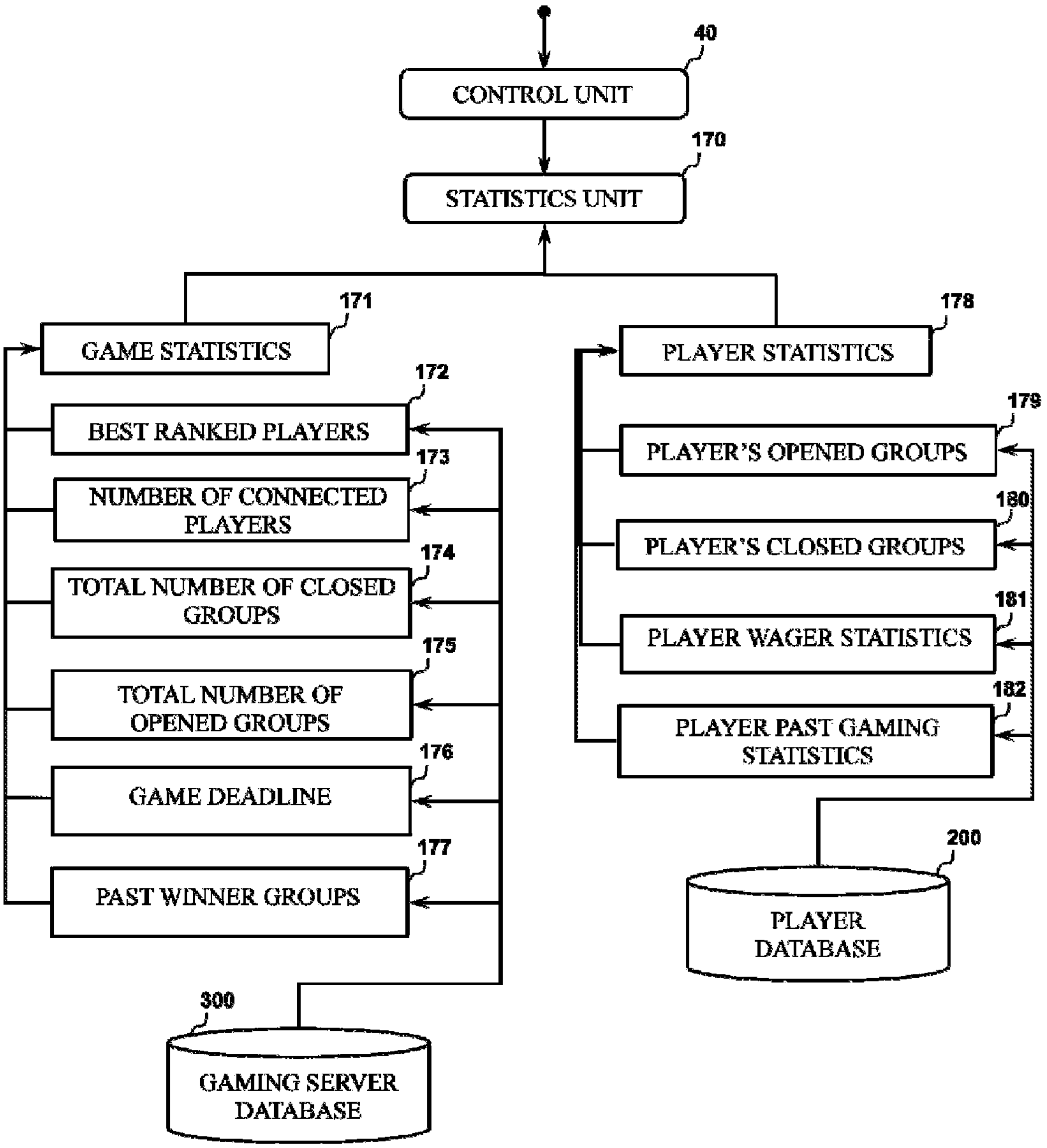
FIG. 13 is a flowchart of the game statistic unit according to an embodiment.

FIG. 13 the flowchart of both game- and player-statistics is shown.

The control unit 40 either retrieves the statistics of the game in module 171 or player's statistic module 178 through the game statistics unit 170. Game statistics contains valuable information about the progress of the interactive lotto game as well as past game statistics. The module 171 executes series of routines of reading from the gaming server database 300 following player's query and displaying: i) best ranked players 172; ii) number of connected players 173; iii) total number of closed groups 174; iv) total number of groups opened 175; v) remaining time of the game 176; and vi) past winner groups 177.

The player statistics module 178 retrieves and displays relevant information for players such as: player's opened groups 179; player's closed groups 180; transactions records, which is part of player's wager statistics 181 and the past player's gaming statistics 182.

Figure 14:
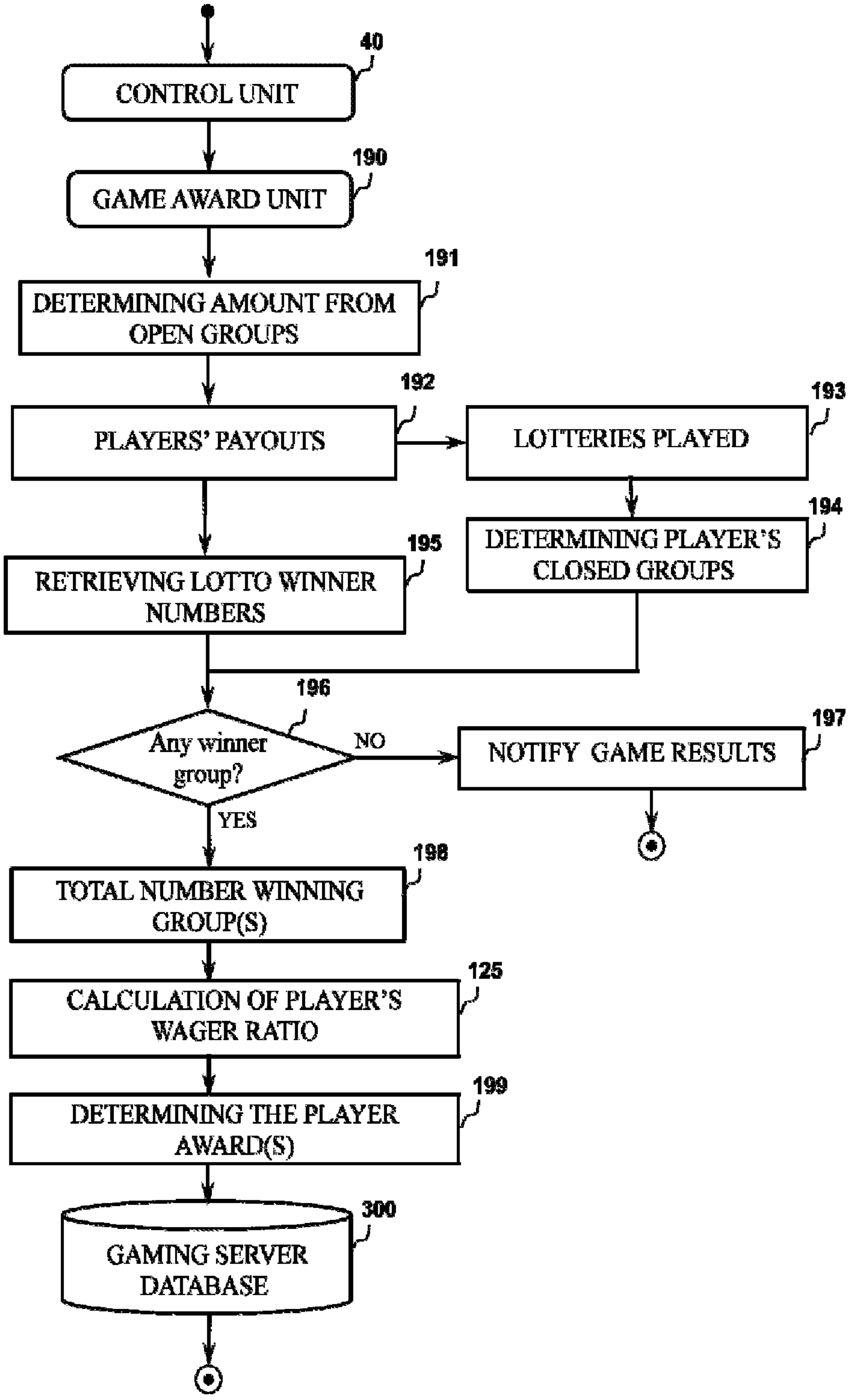
FIG. 14 is a flowchart of the game award unit according to an embodiment.

Referring now to FIG. 14, according to an embodiment, a game award unit 190 determines the players' payouts for winning groups. FIG. 14 a portion corresponding to a portion in FIG. 1 is provided with the same legends.

During the wagering time players may transfer wagers from the lowest/higher wagered groups to other groups in order to close them. In that way, lottery players increase their chance to have more closed groups entered in the jackpot competition. However, after the wagering time has expired, no further wagers or wager transferences are allowed. The gaming server unit 100 executes through module 191 the determination and as well as the collection of the total wager amount left in opened groups. Consequently, this module executes a subroutine that activate a secure channel (SSL) making the transfer of the total wager amount collected from opened groups to the house or portal sponsor. Players upon placing wagers into groups the only way is to move it around to close groups but they cannot be returned to the player wager account therefore the money left into players' opened groups are part of the house- or portal sponsor-revenues.

Next step in module 192 begins the determination of the players' payouts. First, module 193 selects lotteries played for which wagering time has expired. Then the specific day and time for the lottery drawing is loaded into gaming server unit 100, the control unit 40 set an internal timing for automatic execution of the game award unit 190. The player's closed groups entered into the competition are determined in module 194. This module also identifies groups corresponding to each player and consequently update (not shown) player's closed groups into the player database 250 and also the module updates the player wager account unit 80.

Once official winning numbers are advertised by the media or otherwise, the module 195 allows entering it into the gaming server unit. Then, a comparison of the winner number and those closed is done by module 196. In case any closed groups match the winner entry, the module 197 makes an email notification updating interactive lotto gaming results. Similar notifications are performed done into the player's wager account.

In case of successful match the total number of winning groups, $N_u$, are determined by module 198. If the total number of players into the k-th winning group is $N_K$ and then the payout corresponding to i-th player who had played the L-lottery yields to:

$$(O_i^W)_L = \frac{J_P}{N_W} \sum_{m=1}^{N_K} (P_{i,m}^A)_L \tag{7}$$

Based on Equation (7) module 199 determines the payouts for players member of the winning groups.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

The invention claimed is:

1. A method for playing an interactive online lottery game played by players on respective player devices capable of communication with a gaming server unit, the method comprising:

- creating, by the gaming server unit, groups to which are respectively associated a group total wager amount and a combination of symbols;
- receiving, at the gaming server unit, from each of the players, a player wager amount;
- associating fractions of each player wager amount to at least a portion of the groups thereby assigning a distribution percentage of each group of the at least a portion of the groups to each player, wherein the fractions are less than one;
- closing, by the gaming server unit, groups for which the sum of the fractions of the player wager amounts associated thereto equals the group total wager amount, thereby resulting in closed groups;
- comparing a draw result obtained from a limited pool of draw results to the combination of symbols for each closed groups;
- based on the comparing, determining a winning group; and
- calculating a distribution of the prize among the players associated to the winning group according to the assigned distribution percentage;
- whereby the associating fractions of each player wager amount among at least a portion of the groups increases the probability for a player to win the prize as compared to the probability for a player to win the prize in the absence of the step of associating fractions.

2. The method of claim 1, wherein the associating comprises randomly distributing, by the gaming server unit, the player wager amounts among the groups.

3. The method of claim 1, wherein the associating comprises a step where each player selects the groups to which the player wager amounts are distributed by using the combination of symbols associated to the groups.

4. The method of claim 3, further comprising showing a status of each of the selected groups, wherein the status can be one of: open, available, closed and homologue.

5. The method of claim 1, wherein the associating comprises forwarding a query from a player to the gaming server unit, the query comprising a criterion, and performing a search on the groups using the query.

6. The method of claim 5, wherein the performing a search results in showing a status of each of the groups, the status comprising one of: open, available, and closed.

7. The method of claim 6, further comprising, for open groups, giving a player an opportunity to change the associating of its player wager amount.

8. The method of claim 6, further comprising giving a player an opportunity to create a homologue group, the homologue group having the same combination of symbol associated thereto as a closed group.

9. The method of claim 6, wherein the criterion of the query sorts open groups in ascending or descending order and further displays an amount remaining to close each of the open groups.

10. The method of claim 1, wherein the assigning a distribution percentage comprises dividing the fraction of a player wager amount distributed to a group over that group's total wager amount multiplied by 100.

11. The method of claim 1, further comprising performing a draw by the gaming server unit to obtain the draw result.

12. The method of claim 11, wherein for groups which are not closed when the draw is performed, the gaming server unit keeps the associated fractions of each player wager amount.

13. The method of claim 11, wherein the performing a draw takes place at a fixed deadline.

14. The method of claim 1, further comprising automatically sending, by the gaming unit through a player device, a notification to a player for which a player wager amount is associated that a group is closed.

15. The method of claim 1, wherein a minimal amount for player wager amount is one cent.

16. A gaming server unit for playing an interactive online lottery game played by players on respective player devices capable of communication with a gaming server unit, the gaming server unit comprising:

- an input to receive, from each of the players, a player wager amount;
- a processor;
- a memory device accessible by the processor, the memory device storing instructions for retrieval by the processor to implement the processor to:
  - create groups to which are respectively associated a group total wager amount and a combination of symbols;
  - based on an association of fractions to each player wager amount to at least a portion of the groups, assign a distribution percentage of each group of the at least a portion of the groups to each player, wherein the fractions are less than one;
  - close groups for which the sum of the fractions of the player wager amounts associated thereto equals the group total wager amount, thereby resulting in closed groups;
  - compare a draw result obtained from a limited pool of draw results to the combination of symbols for each closed groups;
  - based on the compare step, determine a winning group; and calculate a distribution of the prize among the players associated to the winning group according to the assigned distribution percentage;

whereby the associated fractions of each player wager amount among at least a portion of the groups increases the probability for a player to win the prize as compared to the probability for a player to win the prize in the absence of the associating fractions step.

17. The gaming server unit of claim 16, wherein the gaming server unit is connected to the respective player devices over a network.

18. The gaming server unit of claim 16, wherein the network comprises at least one of the Internet, a Local Area Network ("LAN"), a Wide Area Network ("WAN") and a wireless connection.

19. A method for playing interactive online game and being played by players on respective devices each being in communication with a gaming server unit, the method comprising:

creating, by the gaming server unit, groups to which are respectively associated a group total wager amount and potential outcome;

receiving, at the gaming server unit, from each of the players, a player wager amount;

associating fractions of each player wager amount to at least a portion of the groups thereby assigning a distribution percentage of each group of the at least a portion of the groups to each player;

closing, by the gaming server unit, groups for which the sum of the fractions of the player wager amounts distributed thereto equals the group total wager amount, thereby resulting in closed groups;

obtaining a winning outcome and comparing the winning outcome to the potential outcome for each closed groups; and based on the comparing, determining a winning group; and calculating a distribution of the prize among the players associated to the winning group according to the assigned distribution percentage;

whereby the associating fractions of each player wager amount among at least a portion of the groups increases the probability for a player to win the prize as compared to the probability for a player to win the prize in the absence of the associating fractions step.

* * * * *